United States Patent
Li

(10) Patent No.: US 9,082,318 B2
(45) Date of Patent: Jul. 14, 2015

(54) TUNNEL ENTRANCE ELEVATION SPECIFYING DEVICE, METHOD FOR SPECIFYING TUNNEL ENTRANCE ELEVATION, COMPUTER PROGRAM FOR SPECIFYING TUNNEL ENTRANCE ELEVATION, AND STORAGE MEDIUM THAT STORES COMPUTER PROGRAM

(75) Inventor: Cheng Li, Nagoya (JP)

(73) Assignee: Toyota Mapmaster Incorporated, Nagoya-shi, Aichi (JP)

( * ) Notice: Subject to any disclaimer, the term of this patent is extended or adjusted under 35 U.S.C. 154(b) by 637 days.

(21) Appl. No.: 13/496,160

(22) PCT Filed: Sep. 12, 2011

(86) PCT No.: PCT/JP2011/070752
§ 371 (c)(1),
(2), (4) Date: Mar. 14, 2012

(87) PCT Pub. No.: WO2012/056818
PCT Pub. Date: May 3, 2012

(65) Prior Publication Data
US 2012/0245902 A1    Sep. 27, 2012

(30) Foreign Application Priority Data
Oct. 28, 2010 (JP) .................. 2010-241623

(51) Int. Cl.
*G06F 17/50* (2006.01)
*G09B 29/12* (2006.01)
(Continued)

(52) U.S. Cl.
CPC ............... *G09B 29/12* (2013.01); *G01C 21/32* (2013.01); *G06T 17/05* (2013.01)

(58) Field of Classification Search
CPC .................. G06F 17/30241; G06T 17/05
USPC .............. 701/532; 340/995.1, 995.14, 995.24
See application file for complete search history.

(56) References Cited

U.S. PATENT DOCUMENTS 6,128,573 A * 10/2000 Nomura .................. 701/428
6,650,253 B2 * 11/2003 Mochizuki et al. ........ 340/995.1
(Continued)

FOREIGN PATENT DOCUMENTS

JP    2004-037141 A    2/2004
JP    2004 061155 A    2/2004
(Continued)

OTHER PUBLICATIONS

Supplementary European Search Report EP 11822875; Apr. 15, 2015.

*Primary Examiner* — Thomas G Black
*Assistant Examiner* — Peter D Nolan
(74) *Attorney, Agent, or Firm* — Quarles & Brady LLP; Gavin J. Milczarek-Desai

(57) ABSTRACT

Systems for automatically specifying a tunnel entrance and methods that accomplish same. One method includes a target entrance selecting step for selecting, from a map data storing portion, a target entrance for specifying an entrance elevation of a tunnel, a target road link assigning step for assigning, from the map data storing portion, a road link, which includes the target entrance, as a target road link, a corrected point extracting step for extracting a certain point as a corrected point, the certain point being located along the target road link and away from the target entrance outwardly of the tunnel by a predetermined distance, a corrected point elevation specifying step for specifying an elevation of the corrected point as a corrected point elevation, and a first target entrance elevation specifying step for specifying the corrected point elevation as a first elevation of the target entrance.

9 Claims, 5 Drawing Sheets

(51) Int. Cl.
*G06T 17/05* (2011.01)
*G01C 21/32* (2006.01)

(56) References Cited

U.S. PATENT DOCUMENTS

| | | | |
|---|---|---|---|
| 7,650,240 B2 * | 1/2010 | Welty | 702/5 |
| 8,332,138 B2 * | 12/2012 | Suganuma et al. | 701/408 |
| 8,626,441 B2 * | 1/2014 | Matthews | 701/480 |
| 2005/0251332 A1 * | 11/2005 | Entenmann et al. | 701/208 |
| 2009/0259483 A1 * | 10/2009 | Hendrickson et al. | 705/1 |
| 2010/0114474 A1 | 5/2010 | Suganuma et al. | |

FOREIGN PATENT DOCUMENTS

| | | |
|---|---|---|
| JP | 2005-106906 | 4/2005 |
| JP | 2005-173681 A | 6/2005 |
| JP | 2008-089606 A | 4/2008 |

* cited by examiner

FIG. 2
(A)
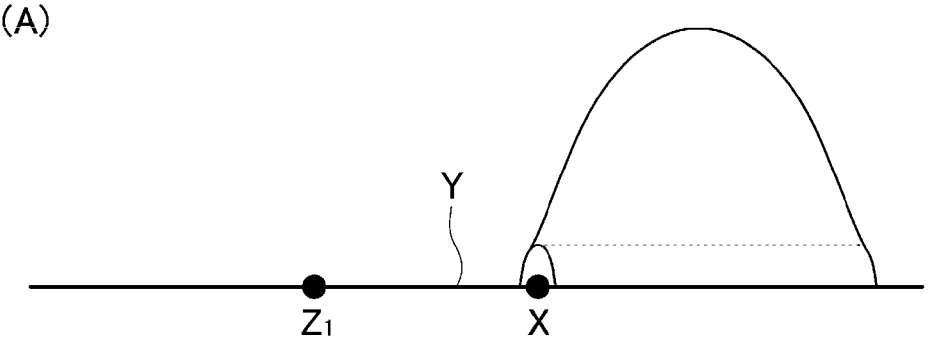
(B)
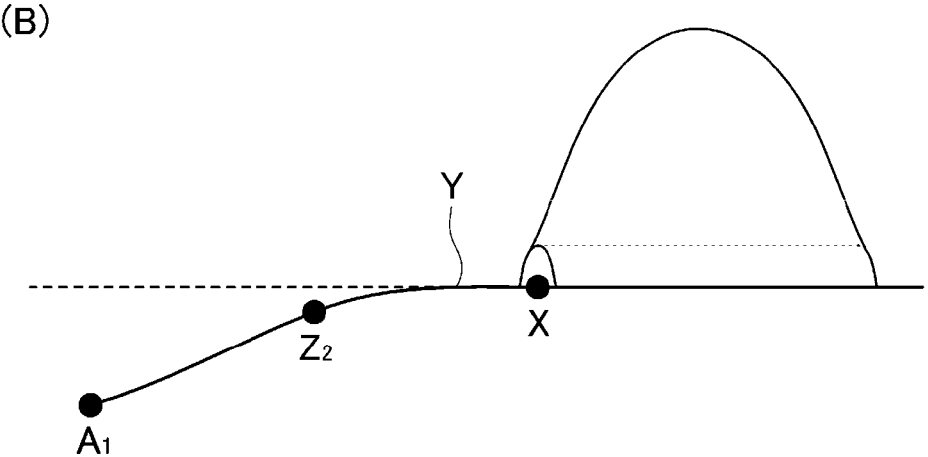
(C)
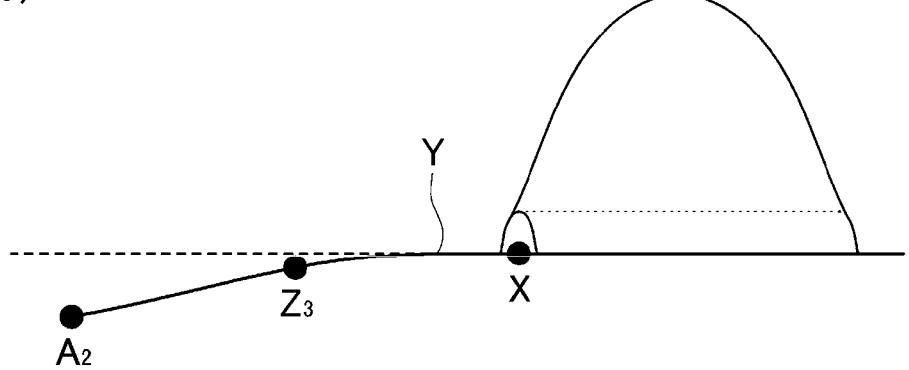

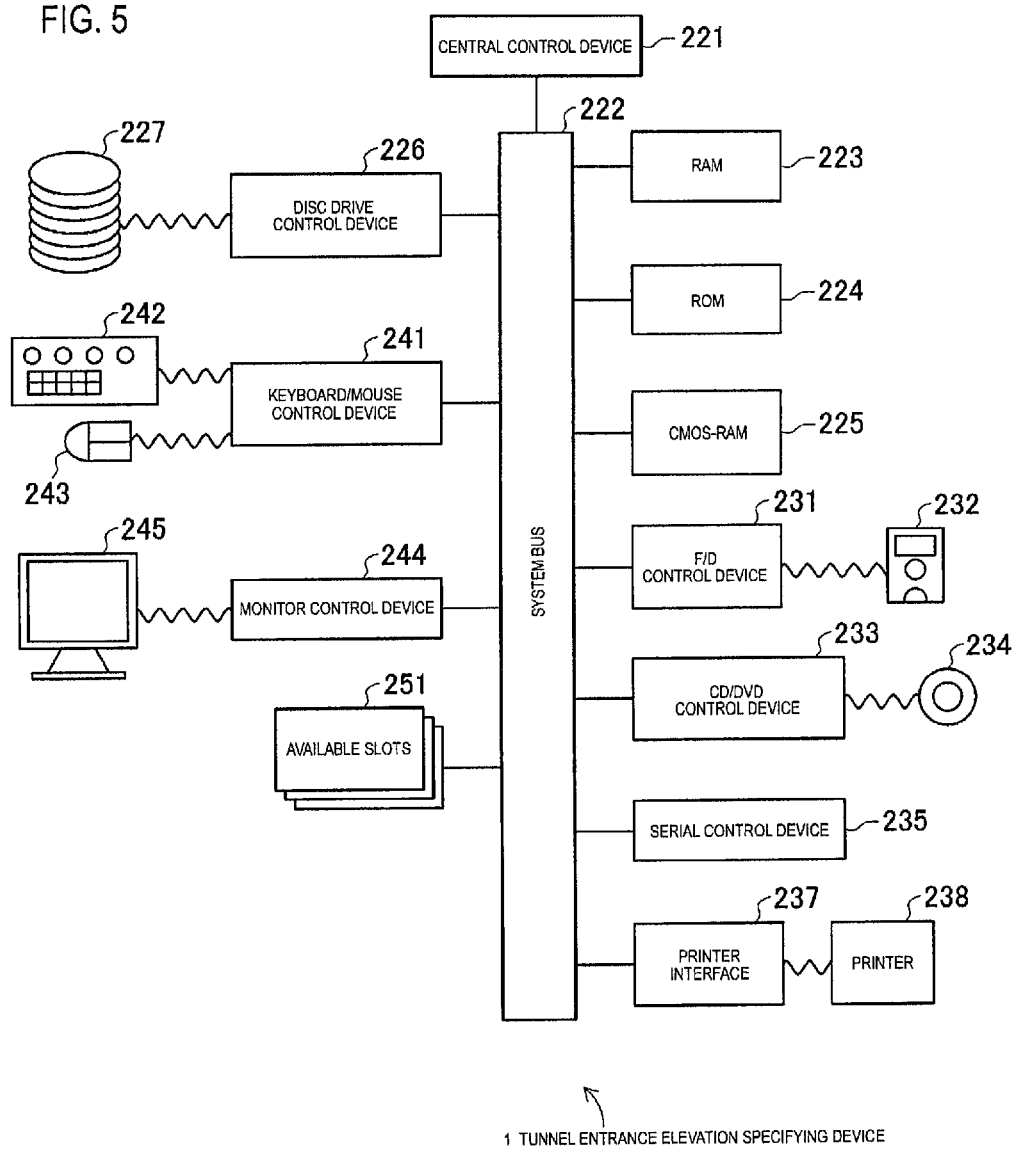

TUNNEL ENTRANCE ELEVATION SPECIFYING DEVICE, METHOD FOR SPECIFYING TUNNEL ENTRANCE ELEVATION, COMPUTER PROGRAM FOR SPECIFYING TUNNEL ENTRANCE ELEVATION, AND STORAGE MEDIUM THAT STORES COMPUTER PROGRAM

FIELD OF INVENTION

The present invention relates to a device and a method for specifying an elevation of a tunnel entrance.

BACKGROUND ART

Regarding the positional accuracy of a topographic map provided for map information, it is said that the position may have error of a dozen meters due to human error, measurement error, or the like. Also, it is known that a road elevation is greatly influenced if the position of the tunnel entrance (i.e. entrance and exit) is off the point because, in general, a terrain elevation widely changes around the tunnel entrance. In other words, when the position of the tunnel entrance is recognized erroneously at a position slightly displaced toward the tunnel, the elevation at the slope of the mountain located above the tunnel is erroneously computed as the road elevation of the entrance.

When the above erroneous elevation is used, for example, the road gradient within the tunnel, which is computed by using the elevation, may generate error.

Thus, in order to highly accurately estimate the road elevation, a vehicular road elevation estimating device is proposed (Patent Document 1). The vehicular road elevation estimating device computes a probability of a surface altitude value that is computed from surface altitude data. Then, the vehicular road elevation estimating device executes a filtering process for weighing the data with higher probability to estimate a road elevation as a value closer to an actual road elevation.

Please refer Patent Documents 2 to 4 that disclose conventional techniques related to the present invention.

PRIOR ART REFERENCE

Patent Document

[Patent Document 1] JP-A-2004-037141
[Patent Document 2] JP-A-2005-173681
[Patent Document 3] JP-A-2005-106906
[Patent Document 4] JP-A-2008-089606

SUMMARY OF THE INVENTION

Problems to be Solved by the Invention

The inventor has energetically studied to more easily specify the road elevation at the tunnel entrance, around which the terrain elevation widely changes. As a result, the inventor noticed the following points.

As above, the terrain elevation widely changes around the tunnel entrance. However, the road around the tunnel entrance does not usually have a steep structure because of the safety purposes, and there is a small elevation difference between the elevation of the tunnel entrance and the elevation of the road that is located a dozen meters away from the tunnel entrance along the road.

The elevation data provided for the map information is computed based on mesh elevation data that indicates an elevation of a point on the map information, and the point on the map corresponds to a grid intersection point of a predetermined size mesh. In other words, the elevation data for an arbitrary point is computed as required by using the above mesh elevation data of four points that surround the arbitrary point. As a result, in order to accurately compute the elevation of the point, it is important to appropriately select the four points. However, in the computation of the elevation of the tunnel entrance, a point located on a mountain slope part above the tunnel may be erroneously selected as one of the points. In the above case, the obtained elevation is influenced by the mesh elevation value of the mountain slope part, and results in a value higher than the actual elevation.

Means for Solving the Problems

The invention is made in view with the above problems, and thereby it is an objective of the present invention to provide a technique that is capable of more easily specifying a tunnel entrance elevation without executing a complex process.

More specifically, a first aspect of the invention is defined as follows.

A tunnel entrance elevation specifying device including:

a target entrance selecting portion that selects, from a map data storing portion, a target entrance for specifying an entrance elevation of a tunnel;

a target road link assigning portion that assigns, from the map data storing portion, a road link, which includes the target entrance, as a target road link;

a corrected point extracting portion that extracts a certain point as a corrected point, the certain point located along the target road link and away from the target entrance outwardly of the tunnel by a predetermined distance;

a corrected point elevation specifying portion that specifies an elevation of the corrected point as a corrected point elevation; and a first target entrance elevation specifying portion that specifies the corrected point elevation as a first elevation of the target entrance.

The tunnel entrance elevation specifying device according to the first aspect as defined above selects a target entrance for specifying a tunnel entrance elevation, and specifies an elevation of a certain point as a corrected point elevation. The certain point is located along a road link, which includes the target entrance, and the certain point is away from the target entrance outwardly of the tunnel by a predetermined distance. The tunnel entrance elevation specifying device specifies the corrected point elevation as a first elevation of the tunnel entrance (i.e. entrance and exit). In the above, the elevation of the corrected point is slightly different from the entrance elevation, and an elevation value of the corrected point is accurately obtainable. Because the elevation of the corrected point is specified as the tunnel entrance elevation in order to replace the tunnel entrance elevation, it is possible to more easily specify the tunnel entrance elevation without executing a complex process. In other words, because a road around the tunnel entrance is usually flat, it is highly likely that the mesh elevation data of the appropriate four points is selected in the computation of the elevation of the above corrected point. Thus, it is possible to obtain a highly accurate elevation value.

The corrected point elevation specifying portion is capable of specifying the corrected point elevation based on mesh elevation data that indicates an elevation of a point on a map, and the point on the map corresponds to a grid intersection point of a predetermined size mesh (second aspect). The mesh elevation data is provided by Geospatial Information Authority of Japan, and is available in a form of a storage medium, such as CD-ROM, similarly to navigation software. A national map is divided into small square-shaped regions with sides each having the length of about 50 m or 10 m, and the mesh elevation data stores an elevation at the center of each region. Also, the above predetermined distance may be set based on a preassigned condition (fourth aspect).

A target road (target road link), which runs from the target entrance, may run along a mountainside. In the above case, it is highly likely that an elevation difference between the above corrected point and the target entrance is large.

Due to the above, a third aspect of the invention is defined as follows. More specifically, the tunnel entrance elevation specifying device according to the second aspect includes:

a second target entrance elevation specifying portion that specifies a second elevation of the target entrance based on the mesh elevation data;

an elevation difference computing portion that computes an elevation difference between the first elevation and the second elevation; and a flag setting portion that sets a flag when the elevation difference is equal to or greater than a predetermined threshold value.

The tunnel entrance elevation specifying device of the third aspect as defined above further specifies the second elevation as the elevation of the target entrance based on the mesh elevation data, and sets a flag to the target entrance that has an elevation difference between the first elevation and the second elevation equal to or greater than a predetermined threshold value. The flag as set above may be employed as an indicator for executing an on-site investigation of the target entrance.

Also, a fifth aspect of the invention is defined as follows. More specifically, a tunnel entrance elevation specifying method including:

a target entrance selecting step for selecting, from a map data storing portion, a target entrance for specifying an entrance elevation of a tunnel;

a target road link assigning step for assigning, from the map data storing portion, a road link, which includes the target entrance, as a target road link;

a corrected point extracting step for extracting a certain point as a corrected point, the certain point located along the target road link and away from the target entrance outwardly of the tunnel by a predetermined distance;

a corrected point elevation specifying step for specifying an elevation of the corrected point as a corrected point elevation; and a first target entrance elevation specifying step for specifying the corrected point elevation as a first elevation of the target entrance.

According to the invention of the fifth aspect as defined above, effects similar to those in the first aspect are achieved.

A sixth aspect of the invention is defined as follows. More specifically, in a tunnel entrance elevation specifying method according to the fifth aspect, the corrected point elevation specifying step specifies the corrected point elevation based on mesh elevation data that indicates an elevation of a point on a map, the point on the map corresponding to a grid intersection point of a predetermined size mesh.

According to the invention of the sixth aspect as defined above, effects similar to those in the second aspect are achieved.

The seventh aspect of the invention is defined as follows. More specifically, a tunnel entrance elevation specifying method according to the sixth aspect includes:

a second target entrance elevation specifying step for specifying a second elevation of the target entrance based on the mesh elevation data;

an elevation difference computing step for computing an elevation difference between the first elevation and the second elevation; and a flag setting step for setting a flag when the elevation difference is equal to or greater than a predetermined threshold value.

According to the invention defined in the seventh aspect as defined above, the effects similar to those of the third aspect are achieved.

The eighth aspect of the invention is defined as follows. More specifically, in a tunnel entrance elevation specifying method according to any one of the fifth to seventh aspects, the predetermined distance is set based on a preassigned condition.

Furthermore, the ninth aspect of the invention is defined as follows. More specifically, a computer program for specifying a tunnel entrance elevation, the computer program causing a computer to function as:

target entrance selecting means for selecting, from a map data storing portion, a target entrance for specifying an entrance elevation of a tunnel;

target road link assigning means for assigning, from the map data storing portion, a road link, which includes the target entrance, as a target road link;

corrected point extracting means for extracting a certain point as a corrected point, the certain point located along the target road link and away from the target entrance outwardly of the tunnel by a predetermined distance;

corrected point elevation specifying means for specifying an elevation of the corrected point as a corrected point elevation;

first target entrance elevation specifying means for specifying the corrected point elevation as a first elevation of the target entrance.

According to the invention defined in the ninth aspect as above, the effect similar to those of the first aspect are achieved.

The tenth aspect of the invention is defined as follows. More specifically, in the computer program according to the ninth aspect, the corrected point elevation specifying means specifies the corrected point elevation based on mesh elevation data that indicates an elevation of a point on a map, the point on the map corresponding to a grid intersection point of a predetermined size mesh.

According to the invention of the tenth aspect as defined above, the effects similar to those of the second aspect are achieved.

The eleventh aspect of the invention is defined as follows. More specifically, the computer program according to the tenth aspect, further causing the computer to function as:

second target entrance elevation specifying means for specifying a second elevation of the target entrance based on the mesh elevation data;

elevation difference computing means for computing an elevation difference between the first elevation and the second elevation; and flag setting means for setting a flag when the elevation difference is equal to or greater than a predetermined threshold value.

According to the invention of the eleventh aspect as defined above, the effects similar to those of the third aspect are achieved.

The twelfth aspect of the invention is defined as follows. More specifically, in the computer program according to any one of the ninth to eleventh aspects, the predetermined distance is set based on a preassigned condition.

According to the invention of the twelfth aspect as defined above, the effects similar to those of the fourth aspect are achieved.

A storage medium that stores the computer program defined in any one of the ninth to twelfth aspects is defined as the thirteenth aspect.

BRIEF DESCRIPTION OF THE DRAWINGS

FIGS. 2(A) to 2(C) are schematic diagrams for explaining a method for specifying a first elevation.

FIG. 5 illustrates a computer system that constitutes the tunnel entrance elevation specifying device according to the embodiment of the present invention.

EMBODIMENT CARRYING OUT THE INVENTION

A tunnel entrance elevation specifying device according to an embodiment of the invention will be described.

Figure 1:
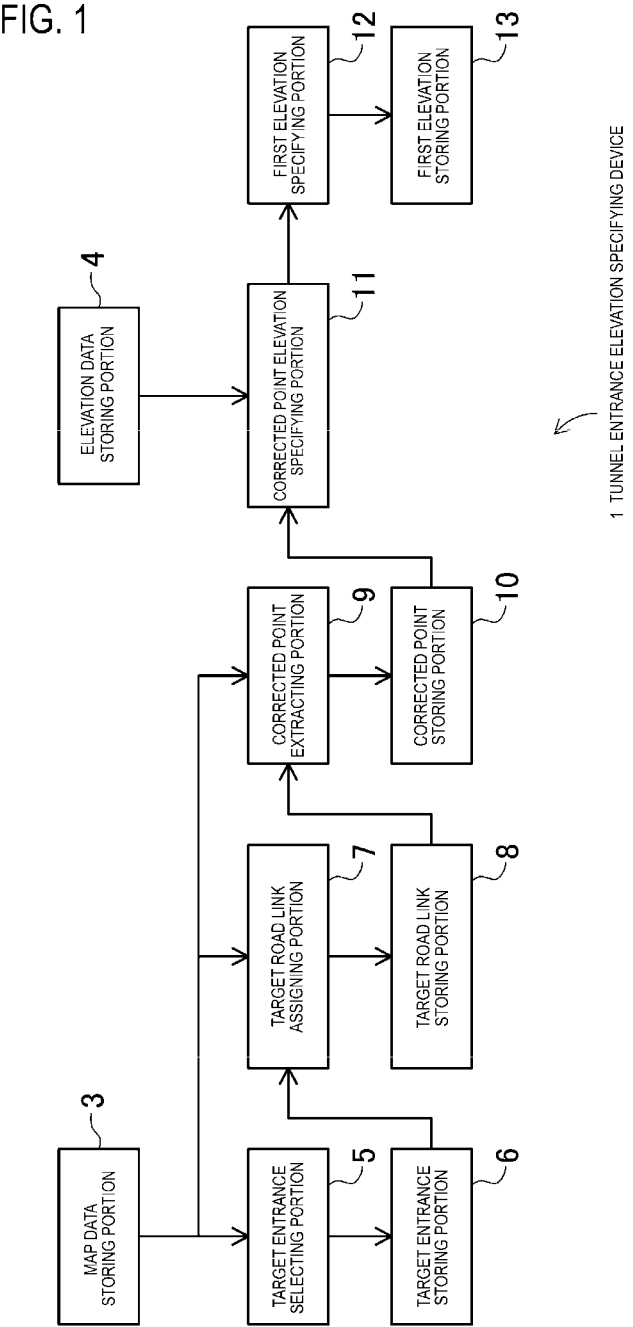
FIG. 1 is a block diagram illustrating a configuration of a tunnel entrance elevation specifying device according to an embodiment of the present invention.

FIG. 1 illustrates a general configuration of a tunnel entrance elevation specifying device 1 according to the embodiment of the invention. Schematic diagrams shown in FIGS. 2(A) to 2(C) will be used as required in the following explanation.

As shown in FIG. 1, the tunnel entrance elevation specifying device 1 includes a map data storing portion 3, an elevation data storing portion 4, a target entrance selecting portion 5, a target entrance storing portion 6, a target road link assigning portion 7, a target road link storing portion 8, a corrected point extracting portion 9, a corrected point storing portion 10, a corrected point elevation specifying portion 11, a first elevation specifying portion 12, and a first elevation storing portion 13.

The map data storing portion 3 stores map information. The map information includes information related to road components (such as, link and node) for defining the map information and information that is drawn in the map.

The elevation data storing portion 4 stores elevation data that is associated with map data. The elevation data may be prepared in advance. Furthermore, the elevation data may be preferably made for the regions sectioned by a predetermined size mesh, and the elevation data may be provided with terrain elevation information. Such data may be, for example, mesh elevation data. The mesh elevation data is released by Geospatial Information Authority of Japan. A national map is divided into small square-shaped regions with sides each having the length of about 50 m or 10 m, and the mesh elevation data stores an elevation at the center of each region.

The target entrance selecting portion 5 refers to the map data storing portion 3, and selects a tunnel entrance, an elevation of which is to be specified, as a target entrance (point X shown in FIG. 2(A)). The selected target entrance is stored in the target entrance storing portion 6.

The target road link assigning portion 7 refers to the map data storing portion 3 and the target entrance storing portion 6, and assigns, as a target road link (link Y shown in FIG. 2(A)), a road link that includes the target entrance (X) selected by the target entrance selecting portion 5. The assigned target road link is stored in the target road link storing portion 8.

The corrected point extracting portion 9 refers to the map data storing portion 3 and the target road link storing portion 8 to extract, as a corrected point (point $Z_1$ shown in FIG. 2(A)), a point, an elevation of which is slightly different from the above target entrance (X), and an elevation value of which is accurately obtainable. In other words, the corrected point extracting portion 9 extract a certain point as the corrected point ($Z_1$). The certain point is located along the target road link (Y) assigned by the target road link assigning portion 7, and the certain point is located away from the target entrance (X), which is selected by the target entrance selecting portion 5, outwardly of the tunnel by a predetermined distance. In the present specification, the predetermined distance is predetermined as a certain distance. The certain distance is not limited to a certain value and may be determined within a range from 30 m to 50 m, for example, provided that a requirement of the above corrected point for accurately specifying the elevation is satisfied. In other words, if the point is located within the certain distance, the point is relatively close to the target entrance, and thereby it is highly likely that the elevation difference between the elevation of the target entrance and the elevation of the corrected point is small. Furthermore, because the point is away from the target entrance by the certain distance, it is unlikely that a point located on mountain slope part is specified for four pieces of the mesh elevation data, which surrounds the corrected point, when the later-described corrected point elevation specifying portion 11, computes the elevation of the corrected point. Also, the above predetermined distance may be alternatively set based on a condition assigned as required depending on intention. The extracted corrected point is stored in the corrected point storing portion 10.

The corrected point elevation specifying portion 11 refers to the elevation data storing portion 4 and the corrected point storing portion 10, and specifies an elevation of the corrected point ($Z_1$) extracted by the corrected point extracting portion 9. The specifying method is not limited to a certain method provided that the method is capable of accurately specifying the elevation of the corrected point. Such a method includes the specifying of the corrected point elevation based on the above mesh elevation data, for example.

The first elevation specifying portion 12 specifies the elevation of the corrected point ($Z_1$), which is specified by the corrected point elevation specifying portion 11, as a first elevation of the target entrance (X). In order to more accurately specify the first elevation, the first elevation may be alternatively specified by optimizing the corrected point elevation if a predefined condition is satisfied. For example, in a case, where the target road (target road link, Y) runs from the target entrance (X) along mountainside, it is highly likely that there is the elevation difference between the target entrance (X) and the corrected point (point $Z_2$ shown in FIG. 2(B)). In the above case, it is highly likely that the elevation difference is large between the elevation of a corrected point ($Z_2$) and the elevation of the point A (point $A_1$ shown in FIG. 2(B)), which is further away from the corrected point ($Z_2$) by an additional certain distance. As a result, in the above case, for example, the value obtained by optimizing the corrected point elevation is preferably used as the first elevation. More specifically, an elevation increasing value per a unit distance is computed based on the elevation difference between the corrected point ($Z_2$) and the point $A_1$. Then, a distance from the target entrance (X), the first elevation of which is to be specified, to the corrected point ($Z_2$) is multiplied by the elevation increasing value to compute a value. Then, the computed value is added to the corrected point elevation in order to more accurately specify the first elevation. Also, because gradient of the road around the tunnel entrance is usually gentle, the computed value, which is to be added to the corrected point elevation, may alternatively employ a reduced elevation increasing value, which is computed by multiplying the elevation increasing value by an appropriate coefficient. The above optimization process may be alternatively executed at the target entrance, which is flagged by a later-described flag setting portion. Also, as shown in FIG. 2(C), when the elevation difference between the corrected point ($Z_3$) and the point $A_2$ is small, it is highly likely that the elevation difference between the target entrance (X) and the corrected point ($Z_3$) is also small. Thus, the above optimization process may not be executed. Furthermore, when there is information suggesting that the target entrance is located around the bridge, the elevated road, or the like, the above process may not be executed. The specified first elevation is associated with the target entrance and is stored in the first elevation storing portion 13.

Figure 3:
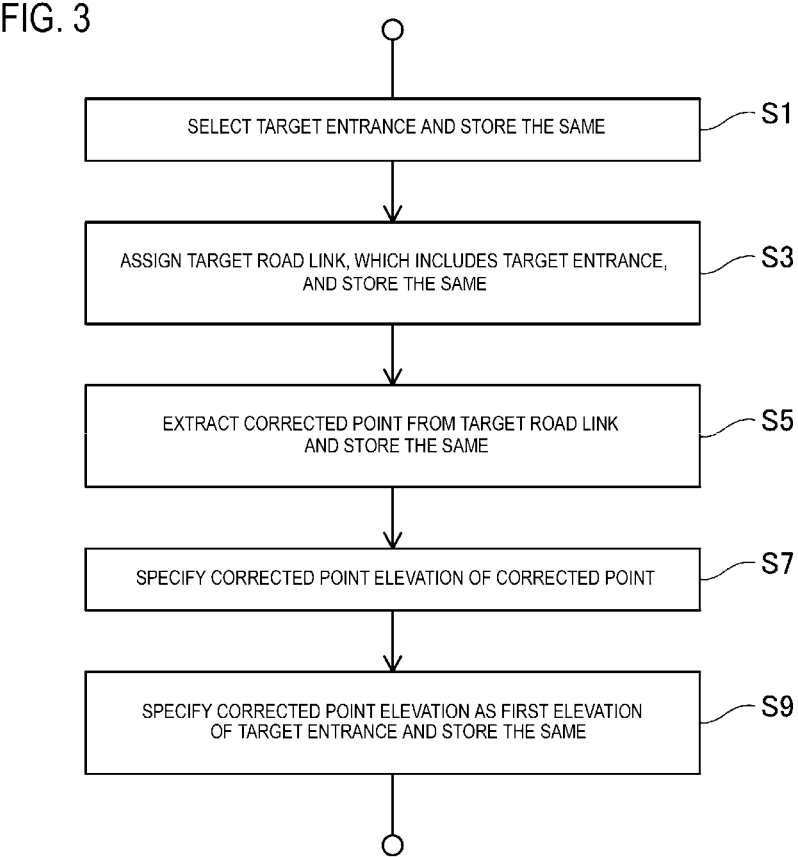
FIG. 3 is a flow chart illustrating an operation of the tunnel entrance elevation specifying device according to the embodiment of the present invention.

The operation of the tunnel entrance elevation specifying device 1 shown in FIG. 1 will be described with reference to FIG. 3.

Firstly, at step 1, the map data storing portion 3 is referred to, and the tunnel entrance, the elevation of which is to be specified, is selected as the target entrance, and is stored.

At step 3, the map data storing portion 3 and the target entrance storing portion 6 are referred to, and the road link, which includes the target entrance selected at step 1, is assigned as the target road link, and is stored.

Next, the map data storing portion 3 and the target road link storing portion 8 are referred to, and a certain point is extracted as the corrected point, and is stored (step 5). In the above, the certain point is located along the target road link assigned at step 3 and is away from the target entrance selected at step 1 outwardly of the tunnel by the predetermined distance.

At step 7, the elevation data storing portion 4 and the corrected point storing portion 10 are referred to, and the elevation of the corrected point extracted at step 5 is specified.

A corrected point elevation of the corrected point specified at step 7 is specified as the first elevation of the target entrance selected at step 1. Then, the information is associated with the target entrance, and is stored in the first elevation storing portion 13 (step 9).

Figure 4:
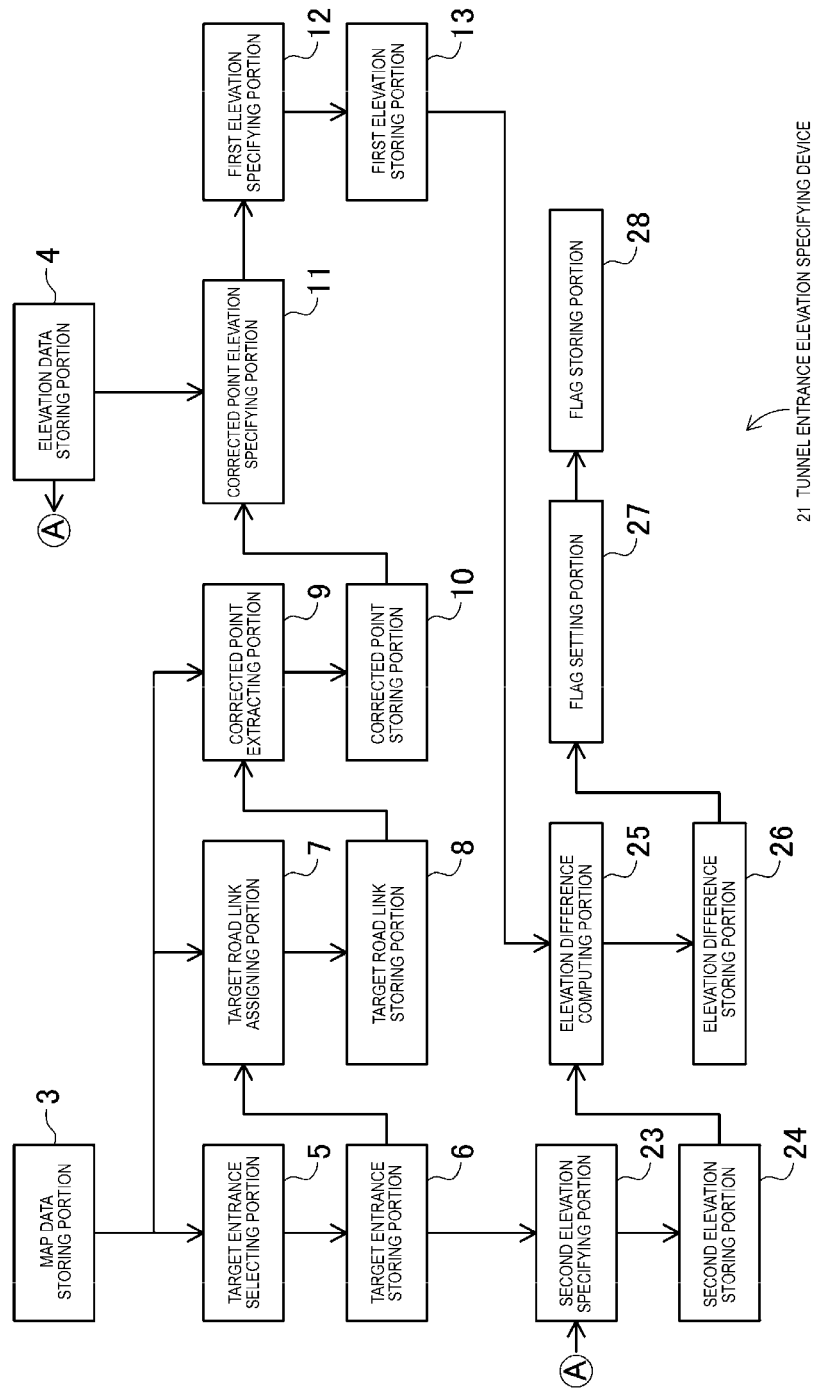
FIG. 4 is a block diagram illustrating a configuration of a tunnel entrance elevation specifying device according to another embodiment of the present invention.

FIG. 4 illustrates a tunnel entrance elevation specifying device 21 of another embodiment. Components in FIG. 4, which are similar to those in FIG. 1, are indicated by the same numerals, and the description thereof is partially omitted.

The tunnel entrance elevation specifying device 21 shown in FIG. 4 further includes, a second elevation specifying portion 23, a second elevation storing portion 24, an elevation difference computing portion 25, an elevation difference storing portion 26, a flag setting portion 27, and a flag storing portion 28 in addition to the components of the tunnel entrance elevation specifying device 1 shown in FIG. 1.

The second elevation specifying portion 23 refers to the elevation data storing portion 4, and specifies a second elevation of the target entrance selected by the target entrance selecting portion 5 based on mesh elevation data. The specified second elevation is stored in the second elevation storing portion 24.

The elevation difference computing portion 25 refers to the first elevation storing portion 13 and the second elevation storing portion 24, and computes a difference between the first elevation and the second elevation. The computed elevation difference is stored in the elevation difference storing portion 26.

The flag setting portion 27 sets a flag based on the elevation difference computed by the elevation difference computing portion 25. The setting of the flag may be executed as required depending on intention, and for example, the flag may be set to the target entrance, at which the elevation difference is equal to or greater than a certain value. The set flag is stored in the flag storing portion 28. The flag as set above may be used as an indicator for executing on-site investigation for the target entrance.

FIG. 5 is a block diagram illustrating a hardware configuration of the tunnel entrance elevation specifying device 1.

In the hardware configuration of the device 1, various components are connected to a central control device 221 through a system bus 222, similarly to general computer systems.

The central control device 221 includes a general CPU, a memory control device, a bus control device, an interrupt control device, and a DMA (direct memory access) device. The system bus 222 includes a data line, an address line, and a control line. The system bus 222 is connected to a memory circuit that includes a RAM (random access memory) 223 and nonvolatile memories (ROM 224, CMOS-RAM 225). The data stored in the RAM 223 is read and rewritten by the central control device 221 and other hardware components. The data of the nonvolatile memories is read-only, and remains stored even when the device is turned off. System programs for controlling the hardware are stored in a hard disk drive 227 and in the RAM 223. The system programs are retrieved and used by the central control device 221 as required through a disk drive control device 226. The hard disk drive 227 has an area for storing computer programs that causes a computer system having a general configuration to operate as the tunnel entrance elevation specifying device 1.

A predetermined area of the hard disk drive 227 is assigned to a storing portion that stores the specification results of the first elevation specifying portion 12.

Other areas of the hard disk drive 227 are assigned to the map data storing portion 3 and the elevation data storing portion 4.

The system bus 222 is connected to a flexible drive control device 231 and a CD/DVD control device 233. The flexible drive control device 231 reads data from and writes data to a flexible disk 232. The CD/DVD control device 233 retrieves data from the compact disc 234. In this example, a printer interface 237 is connected to a printer 238.

The system bus 222 is connected to a keyboard/mouse control device 241, and is capable of receiving data from a keyboard 242 and a mouse 243. A monitor 245 is connected to the system bus 222 through a monitor control device 244. The monitor 245 may employ a CRT type monitor, a liquid crystal type monitor, or a plasma display type monitor.

There is provided slots 251 available for the additional various components (such as a modem).

Programs (OS program, application program (including the application of the present invention)) required for operating the tunnel entrance elevation specifying device 1 with the computer system are installed in the system through various storage media. For example, the programs are installable through a non-writable storage medium (CD-ROM, ROM card, etc.), a writable storage medium (FD, DVD, etc.), or further through a network as a format of a communication medium. The programs may be prestored in the nonvolatile memories 224, 225 and the hard disk drive 227.

Although the embodiments of the present invention are described as above, two or more of the above embodiments may be combined and executed. Alternatively, only a part of one of the embodiments may be executed. Furthermore, parts of two or more of the embodiments may be combined and executed.

The invention is not limited to the description of the embodiments or the examples of the above invention. The invention includes various modifications provided that the various modifications do not depart from description of appended claims and are easily made by those skilled in the art.

DESCRIPTION OF THE NUMERALS

1, 21 tunnel entrance elevation specifying device
3 map data storing portion
4 elevation data storing portion
5 target entrance selecting portion
7 target road link assigning portion
9 corrected point extracting portion
11 corrected point elevation specifying portion
12 first elevation specifying portion
23 second elevation specifying portion
25 elevation difference computing portion
27 flag setting portion

The invention claimed is:

1. A tunnel entrance elevation specifying device comprising:
   a target entrance selecting portion that selects, from a map data storing portion, a target entrance for specifying an entrance elevation of a tunnel;
   a target road link assigning portion that assigns, from the map data storing portion, a road link, which includes the target entrance, as a target road link;
   a corrected point extracting portion that extracts a certain point as a corrected point, the certain point located along the target road link and away from the target entrance outwardly of the tunnel by a predetermined distance;
   a corrected point elevation specifying portion that specifies an elevation of the corrected point as a corrected point elevation; and
   a first target entrance elevation specifying portion that specifies the corrected point elevation as a first elevation of the target entrance, wherein the corrected point elevation specifying portion specifies the corrected point elevation based on mesh elevation data that indicates an elevation of a point on a map, the point on the map corresponding to a grid intersection point of a predetermined size mesh.

2. The tunnel entrance elevation specifying device according to claim 1, comprising:
   a second target entrance elevation specifying portion that specifies a second elevation of the target entrance based on the mesh elevation data;
   an elevation difference computing portion that computes an elevation difference between the first elevation and the second elevation; and
   a flag setting portion that sets a flag when the elevation difference is equal to or greater than a predetermined threshold value.

3. The tunnel entrance elevation specifying device according to claim 1, wherein the predetermined distance is set based on a preassigned condition.

4. A tunnel entrance elevation specifying method comprising:
   a target entrance selecting step for selecting, from a map data storing portion, a target entrance for specifying an entrance elevation of a tunnel;
   a target road link assigning step for assigning, from the map data storing portion, a road link, which includes the target entrance, as a target road link;
   a corrected point extracting step for extracting a certain point as a corrected point, the certain point located along the target road link and away from the target entrance outwardly of the tunnel by a predetermined distance;
   a corrected point elevation specifying step for specifying an elevation of the corrected point as a corrected point elevation; and
   a first target entrance elevation specifying step for specifying the corrected point elevation as a first elevation of the target entrance, wherein the corrected point elevation specifying step specifies the corrected point elevation based on mesh elevation data that indicates an elevation of a point on a map, the point on the map corresponding to a grid intersection point of a predetermined size mesh.

5. The tunnel entrance elevation specifying method according to claim 4, comprising:
   a second target entrance elevation specifying step for specifying a second elevation of the target entrance based on the mesh elevation data;
   an elevation difference computing step for computing an elevation difference between the first elevation and the second elevation; and
   a flag setting step for setting a flag when the elevation difference is equal to or greater than a predetermined threshold value.

6. The tunnel entrance elevation specifying method according to claim 4, wherein the predetermined distance is set based on a preassigned condition.

7. A non-transitory computer readable storage medium for specifying a tunnel entrance elevation, the computer readable storage medium containing computer readable code causing a computer to function as:
   target entrance selecting means for selecting, from a map data storing portion, a target entrance for specifying an entrance elevation of a tunnel;
   target road link assigning means for assigning, from the map data storing portion, a road link, which includes the target entrance, as a target road link;
   corrected point extracting means for extracting a certain point as a corrected point, the certain point located along the target road link and away from the target entrance outwardly of the tunnel by a predetermined distance;
   corrected point elevation specifying means for specifying an elevation of the corrected point as a corrected point elevation;
   first target entrance elevation specifying means for specifying the corrected point elevation as a first elevation of the target entrance, wherein the corrected point elevation specifying means specifies the corrected point elevation based on mesh elevation data that indicates an elevation of a point on a map, the point on the map corresponding to a grid intersection point of a predetermined size mesh.

8. The non-transitory computer readable storage medium according to claim 7, further causing the computer to function as:
- second target entrance elevation specifying means for specifying a second elevation of the target entrance based on the mesh elevation data;
- elevation difference computing means for computing an elevation difference between the first elevation and the second elevation; and
- flag setting means for setting a flag when the elevation difference is equal to or greater than a predetermined threshold value.

9. The non-transitory computer readable storage medium according to claim 7, wherein the predetermined distance is set based on a preassigned condition.

* * * * *